3,738,986
N-(1-ALKENYL)-PIPERAZINES
Stanley Robert Sandler, Springfield, and Maria Louisa Delgado, Philadelphia, Pa., assignors to Borden Inc., New York, N.Y.
No Drawing. Continuation-in-part of abandoned application Ser. No. 759,766, Sept. 13, 1968. This application May 14, 1971, Ser. No. 143,658
Int. Cl. C07d 51/70
U.S. Cl. 260—268 R     3 Claims

ABSTRACT OF THE DISCLOSURE

This invention relates to novel mono-substituted derivatives of piperazine in which one hydrogen of piperazine is substituted by a 1-alkenyl radical containing from 3 to 10 carbon atoms, and to a method for making said derivatives in good yield by reacting piperazine with the corresponding $C_3$ to $C_{10}$ aldehydes at between $-30°$ C. and $+40°$ C. in a medium in which the aldehyde is soluble.

REFERENCE TO A RELATED APPLICATION

This application is a continuation-in-part of application Ser. No. 759,766, now abandoned, which was filed on Sept. 13, 1968.

BACKGROUND OF THE INVENTION

Secondary amines in general are known to yield the corresponding alkylene-amines when reacted with aldehyde at refluxing temperatures. In the case of piperazine, the product obtained in this manner is the di-substitution product. For example, isobutyraldehyde and piperazine yield di-N,N'-(1-isobutenyl)piperazine; the corresponding mono-substituted piperazines are unknown. Such di-substituted piperazines no longer possess the secondary amine moiety and are not suitable as cross-linking agents for use in the preparation of epoxy resins. A suitable piperazine should contain both an unsaturated olefin moiety and a secondary amine moiety.

SUMMARY OF THE INVENTION

A method has now been found whereby mono-substituted N-(1-alkenyl) addition products of piperazine can be obtained in good yield.

In brief, our invention comprises N-(1-alkenyl) piperazines having the generic formula:

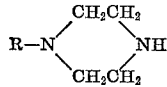

where R is a 1-alkenyl group containing from three to ten carbon atoms and has the structure

where R' is selected from the group consisting of hydrogen, alkyl, alkenyl, cycloalkyl, aryl and arylalkyl groups, and R" is selected from the group consisting of alkyl, alkenyl, cycloalkyl, aryl and arylalkyl groups. The invention also comprises the method of making such products by reacting piperazine with aldehydes at between $-30°$ C. and $+40°$ C. in a medium in which the aldehyde is soluble.

DETAILED DESCRIPTION

The method of reacting an aldehyde with piperazine according to this invention comprises the use of a reaction medium in which the aldehyde is soluble. In cases where the aldehyde is a liquid and the desired alkenyl reaction product of piperazine is substantially insoluble therein, the aldehyde by itself may be used as the medium. However, even in such cases, we prefer to add the piperazine as a dispersion in an inert solvent compatible with the aldehyde. Solvents which have been found particularly suitable for this purpose include tetrahydrofuran, dioxane, diethyl ether and in certain cases, dimethylformamide.

As used hereinafter, the term "aldehyde medium" is intended to designate the reaction phase comprising the aldehyde either alone or with suitable compatible solvent.

The reaction of this invention can be carried out between piperazine and any aldehyde having three to ten carbon atoms, provided that the carbon adjacent to the aldehyde group has a labile hydrogen atom capable of forming the enol tautomer. Thus, suitable aldehydes may be selected from the class of aldehydes having the generic formula

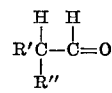

where R' may be selected from the group consisting of hydrogen, alkyl, alkenyl, aryl, cycloalkyl and arylalkyl and R" may be selected from the group consisting of alkyl, alkenyl, aryl, cycloalkyl and arylalkyl. Examples of aldehydes which belong to said class include: propionaldehyde, n-butyraldehyde, isobutyraldehyde, n-but-3-enal, n-valeraldehyde, isovaleraldehyde, n-caproaldehyde, enanthaldehyde, caprylaldehyde, pelargonaldehyde, capric aldehyde, aldehydrocyclohexane, phenyl acetaldehyde, 3-phenyl propionaldehyde and 2-cyclohexylpropionaldehyde.

Neither the actual concentration of the reactants nor the instantaneous ratio of their concentrations is critical in obtaining the objectives of this invention. The desired 1:1 reaction product is attained even with extreme excesses of aldehyde. Surprisingly, a large excess of aldehyde does not result in the formation of a doubly substituted product.

While it is possible to reverse the mode of addition, namely to add the aldehyde dropwise to the suspension of piperazine in the selected solvent, it is considered more convenient to add the piperazine to the aldehyde. Piperazine in the dry state may be dusted into the reaction medium but it is considered more practical to disperse the piperazine in an appropriate solvent.

For the purposes of economy and optimum operating conditions, it is, of course, desirable to use an amount of aldehyde closely equal to the amount chemically equivalent to the piperazine. Thus, for practical purposes between one and two moles of piperazine may be used for one mole of aldehyde, but one mole of piperazine to one mole of aldehyde is preferred.

A condition essential to carrying out the method of the instant invention is the use of reaction temperatures no higher than 40° C. Since the reaction is exothermic, it is preferable to start the reaction at a super-cold temperature, a preferred procedure being first cooling the aldehyde medium to about $-20°$ C., then gradually adding the piperazine or piperazine dispersion over the course of about one hour. Since the reaction is exothermic the temperature may reach as high as 40° C. during the reaction stage. However, it is preferred to cool sufficiently to maintain the temperature below about 30° C. The rate of addition as well as cooling can be adjusted so as to insure maintenance of temperature within the desired limitations.

The alkenyl piperazine addition products of this invention have been found particularly useful in the curing of epoxy resins such as derived from tris(2,3-epoxypropyl)trimesoate, di(2,3 - epoxypropyl)-phthalate, tetraglycidyl pyromellitate, diglycidyl isophthalate and di(2,3- epoxypropyl) terephthalate. The alkenyl piperazines are also potentially useful as intermediates in chemical synthesis, such as for the purpose of developing surfactants and emulsifying agents.

This invention will be further described in connection with the following examples of the practice of it. It should be understood, however, that these examples are merely illustrative and are not to be regarded as limitations to the appended claims, since the basic technique may be varied at will as will be understood by one skilled in the art.

EXAMPLE I

To a flask with 288 g. (4.0 moles) of n-butyraldehyde cooled to −20° C. was slowly added a suspension of 172 g. (2.0 moles) of piperazine in 300 ml. of tetrahydrofuran over a period of one hour. The highest temperature reached in the flask was 35° C. The reaction mixture was stirred for an additional hour at 0° and then 200 ml. of tetrahydrofuran was added. Stirring was continued at room temperature for 16 hours. The contents were then filtered, washed with acetone and dried. The solid product of N-1-butenylpiperazine was obtained in 79% yield, M.P. 83–85° C.

Elemental analysis, percent calculated: C, 68.58; H, 11.42; N, 20.00. Found (percent): C, 68.40; H, 11.36; N, 19.75; molecular weight, theoretical 140, found by vapor phase osmometer, 140.

Ultraviolet absorption:

220 m$\mu$, E max. 1070.

Infrared major absorption bands (KBr): 3.4$\mu$, 3.57$\mu$, 6.05$\mu$ (>C=O), 8.65$\mu$, 10.08$\mu$.

Nuclear magnetic resonance (CDCl$_3$): Triplet at 0.98$\delta$ (—CH$_3$), multiplet at 1.98$\delta$ (≡CH), Multiplet at 2.98$\delta$ (—NN—), multiplet at 4.5$\delta$ (=CH—CH$_2$), and a doublet at 5.7$\delta$, 5.9$\delta$ (—N—CH=).

EXAMPLE II

To a flask containing 58 g. (1.0 mole) propionaldehyde cooled to −20° C. was slowly added a suspension of 43 g. (0.5 mole) of piperazine in 80 ml. of tetrahydrofuran over a period of 30 minutes. The highest temperature reached in the flask was 40° C. The reaction was allowed to stand for 18 hours at room temperature and concentration yielded 63 g. of the solid product N-1-propenylpiperazine.

UV: 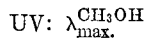

221 m$\mu$ E max. 1470.

IR: (KBr) (major absorption bands): 3.40$\mu$, 3.57$\mu$, 6.02$\mu$, 6.90$\mu$, 7.87$\mu$, 8.67$\mu$, 8.52$\mu$, 10.02$\mu$.

EXAMPLE III

The procedure of Example I is followed excepting that the n-butyraldehyde there used was replaced separately and in turn by an equimolar proportion of each of the following: N-valeraldehyde, enanthaldehyde, n-but-3-enal, capric aldehyde, phenyl acetaldehyde and 2-cyclohexypropionaldehyde. In each case the corresponding mono-substituted N(1-alkenyl) derivatives of piperazine was obtained.

EXAMPLE IV 140 g. of N-1-butenylpiperazine were added to 340 g. of bisphenol A diepoxide with good agitation. Two samples of the mixture were then taken and cured to a hard polymer at room temperature and at 100° C. Curing at room temperature required 24 hours while at 100° C., 1 hour sufficed.

The uncured mixture was also used to bond aluminum-to-aluminum and stainless steel-to-stainless steel. After curing the bonds at elevated temperatures, the tensile shear strength thereof was in excess of 2000 p.s.i., as measured at room temperature.

What is claimed is:

1. A method of preparing a N-(1-alkenyl)piperazine consisting of reacting, at a temperature between about −30° C .and +40° C. in a solvent selected from the group consisting of tetrahydrofuran, dioxane, diethylether and dimethylformamide, piperazine with an aldehyde having from 3 to 10 carbon atoms and having the composition

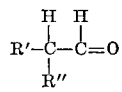

where R' is selected from the group consisting of hydrogen, C$_1$–C$_8$ alkyls, phenyl and cyclohexylmethyl; R" is selected from the group consisting of alkyls having a number of carbon atoms such that the total number of carbon atoms in the aldehyde does not exceed 10.

2. The method of claim 1 including first preparing a suspension of piperazine in said solvent and then gradually adding said suspension to a solution of the aldehyde in said solvent.

3. The method of claim 2 wherein the aldehyde is butyraldehyde and the solvent is tetrahydrofuran.

References Cited

UNITED STATES PATENTS

| | | | |
|---|---|---|---|
| 2,899,431 | 8/1959 | Sherlock | 260—243 |
| 3,050,521 | 8/1962 | Niederhauser | 260—268 R |
| 3,074,940 | 1/1963 | Benzing | 260—268 R |

DONALD G. DAUS, Primary Examiner